(12) United States Patent
Ehrne et al.

(10) Patent No.: US 10,738,895 B2
(45) Date of Patent: Aug. 11, 2020

(54) VACUUM VALVE

(71) Applicant: VAT Holding AG, Haag (CH)

(72) Inventors: Florian Ehrne, Frumsen (CH); Martin Netzer, Bludenz (AT)

(73) Assignee: VAT Holding AG, Haag (CH)

(*) Notice: Subject to any disclaimer, the term of this patent is extended or adjusted under 35 U.S.C. 154(b) by 281 days.

(21) Appl. No.: 15/747,271

(22) PCT Filed: Jul. 25, 2016

(86) PCT No.: PCT/EP2016/067647
§ 371 (c)(1),
(2) Date: Jan. 24, 2018

(87) PCT Pub. No.: WO2017/036672
PCT Pub. Date: Mar. 9, 2017

(65) Prior Publication Data
US 2018/0216739 A1 Aug. 2, 2018

(30) Foreign Application Priority Data
Aug. 28, 2015 (AT) .................................. A 569/2015

(51) Int. Cl.
*F16K 3/18* (2006.01)
*F16K 3/316* (2006.01)
(Continued)

(52) U.S. Cl.
CPC ............... *F16K 3/18* (2013.01); *F16K 3/029* (2013.01); *F16K 3/0281* (2013.01); *F16K 3/3165* (2013.01); *F16K 51/02* (2013.01)

(58) Field of Classification Search
CPC .......... F16K 3/18; F16K 3/3165; F16K 3/029; F16K 3/0281; F16K 51/02
See application file for complete search history.

(56) References Cited

U.S. PATENT DOCUMENTS 3,321,174 A 5/1967 Schertler
3,368,792 A 2/1968 Schertler
(Continued)

FOREIGN PATENT DOCUMENTS

CH 508154 7/1971
CH 640924 1/1984
(Continued)

*Primary Examiner* — Marina A Tietjen
(74) *Attorney, Agent, or Firm* — Volpe and Koenig, P.C.

(57) ABSTRACT

Vacuum valve having a valve housing with first and second valve openings, and a closure unit having first and second plates, a roller support arranged between the plates, multiple roller pairs, each formed from first and second spreading rollers, and a spring. The plates are carried together with the roller support when it moves parallel to a movement direction from the open position into an intermediate position, and an additional movement of the plates in the movement direction is blocked when the roller support moves from the intermediate position into a closed position, during which the spreading rollers move along rising flanks of recesses, and the plates are thus spread apart. Rotational axes of the spreading rollers of each roller pair are offset relative to each other and are spaced apart in the spreading direction by a distance smaller than a sum of the radiuses of the spreading rollers.

10 Claims, 6 Drawing Sheets

(51) Int. Cl.
 *F16K 3/02* (2006.01)
 *F16K 51/02* (2006.01)

(56) References Cited

U.S. PATENT DOCUMENTS

| | | | |
|---|---|---|---|
| 4,052,036 A | | 10/1977 | Schertler |
| 4,165,858 A | * | 8/1979 | Thackrey ................ F16K 3/18 |
| | | | 251/168 |
| 4,470,576 A | | 9/1984 | Schertler |
| 4,495,966 A | * | 1/1985 | Longamore ............ F16K 3/182 |
| | | | 137/572 |
| 5,379,983 A | | 1/1995 | Geiser |
| 8,215,612 B2 | * | 7/2012 | Ehrne ..................... F16K 51/02 |
| | | | 251/203 |
| 9,638,335 B2 | * | 5/2017 | Huang .................... F16K 3/184 |

FOREIGN PATENT DOCUMENTS

| | | |
|---|---|---|
| CN | 201053510 | 4/2008 |
| CN | 102057193 | 5/2011 |
| CN | 203272833 | 11/2013 |
| CN | 204004487 | 12/2014 |
| CN | 104455506 | 3/2015 |
| CN | 204267768 | 4/2015 |
| EP | 0314832 | 5/1989 |
| JP | H9210246 | 8/1997 |
| KR | 100779241 | 11/2007 |

\* cited by examiner

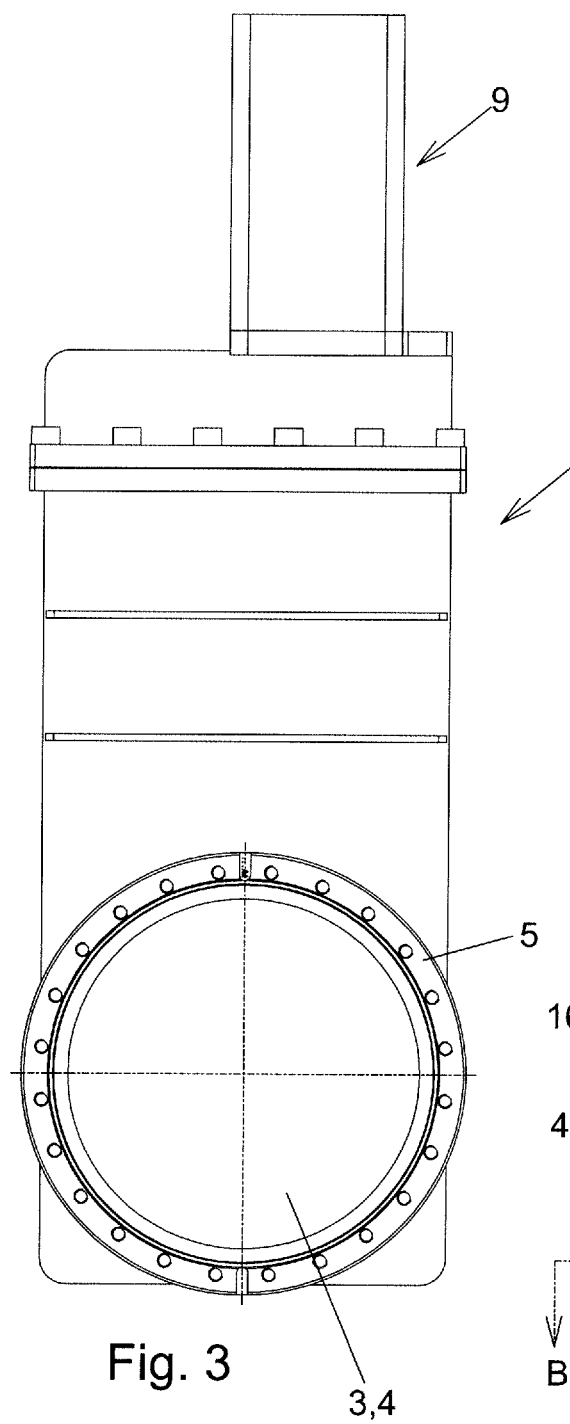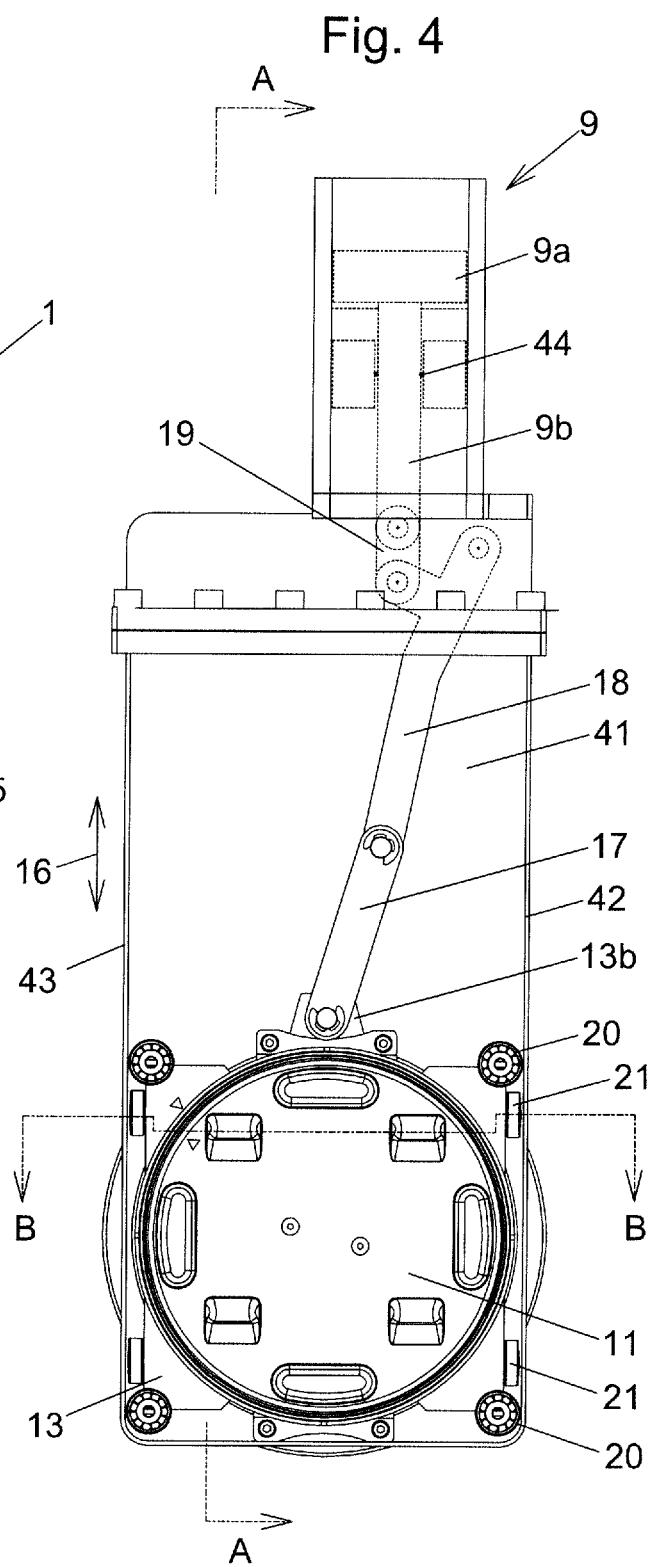
Fig. 3
Fig. 4

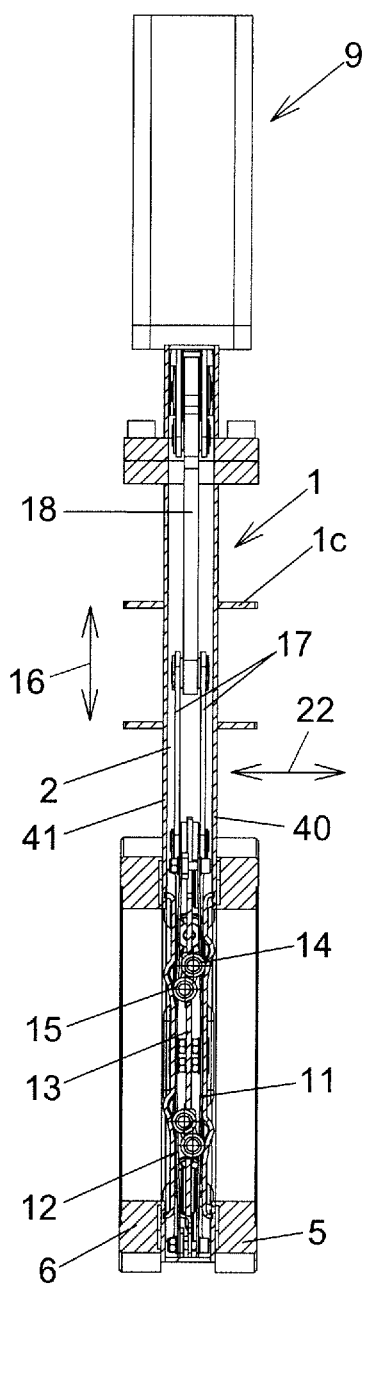
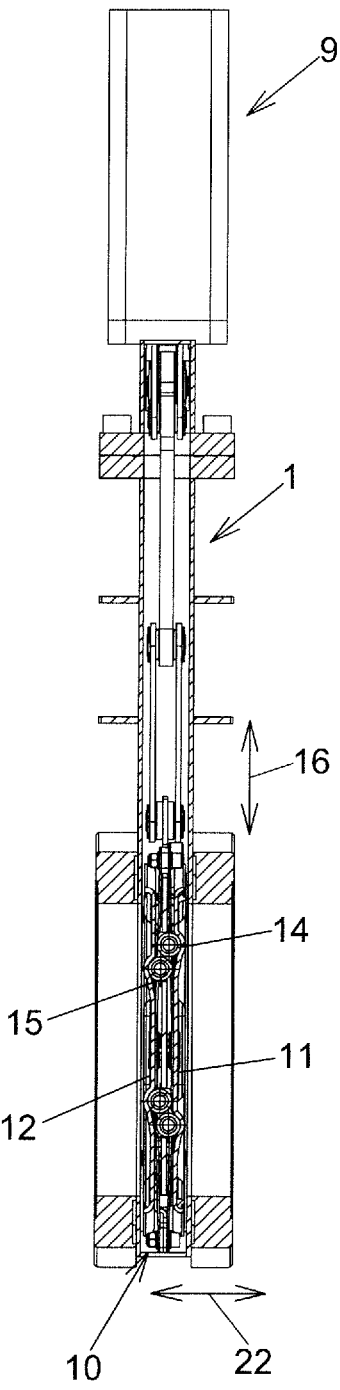
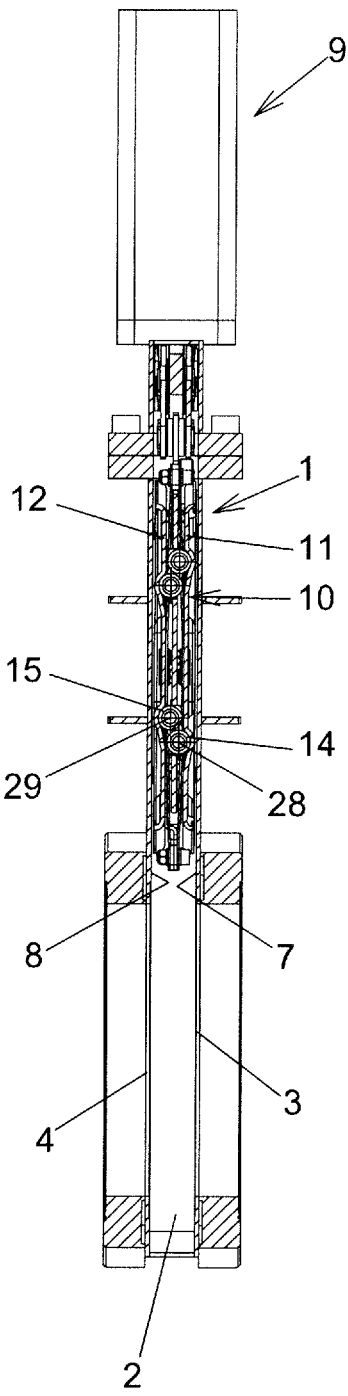

VACUUM VALVE

BACKGROUND

The invention relates to a vacuum valve comprising a valve housing with an interior and first and second valve openings which are surrounded by first and second seat surfaces, and a closure unit arranged in the interior of the valve housing, said closure unit having a first plate, a second plate, a roller carrier arranged between the first plate and the second plate, a plurality of roller pairs which are each formed by a first spreading roller and a second spreading roller which are mounted on the roller carrier so as to be rotatable about respective axes of rotation, and at least one spring by which the first and second plates are pulled against the spreading rollers, which bear against mutually facing surfaces of the first and second plates, wherein the roller carrier is displaceable, parallel to a displacement direction, from an open position, in which the vacuum valve is open and the first and second valve openings are cleared, via an intermediate position, in which the first and second plates are located between the first and second valve openings but are spaced apart from the first and second seat surfaces, into a closed position, in which the vacuum valve is closed, and during the displacement of the roller carrier from the open position into the intermediate position, the first and second plates are carried along by the roller carrier, and during the displacement of the roller carrier from the intermediate position into the closed position, any further displacement of the first and second plates in the displacement direction is blocked, wherein, in the open position and intermediate position of the roller carrier, the first spreading roller of each roller pair bears against the surface of the first plate in the region of a respective recess in the surface of the first plate, and the second spreading roller of each roller pair bears against the surface of the second plate in the region of a respective recess in the surface of the second plate, and during the displacement of the roller carrier from the intermediate position into the closed position, the first and second spreading rollers are displaced along rising flanks of the recesses and in the process spread apart the first and second plates parallel to a spreading direction.

Vacuum valves of this kind, also referred to as slide valves, having closure units that are able to be spread apart are known in various embodiments. In a common embodiment, balls are used to spread apart the two plates of the closure unit, said balls being arranged in pairs in a ball cage arranged between the two plates. In the moved-together state of the closure unit, the balls project into recesses in the plates. In order to spread the plates apart, the ball cage is displaced with respect to the plates, wherein the balls are guided at least partially out of the recesses in the plates. Configurations of this kind can be gathered for example from U.S. Pat. Nos. 4,052,036 A, 5,379,983 A, 3,368,792 A and CH 508 154 A.

Instead of balls arranged in a ball cage, the use of spreading rollers is also already known, said spreading rollers being mounted on a roller carrier, arranged between the first and the second plate, so as to be rotatable about axes of rotation. Wear can be reduced as a result. In order that the forces required to spread the first and second plates apart are each introduced into the same regions of the roller carrier, the spreading rollers are arranged in pairs as roller pairs. Of each roller pair, the first spreading roller cooperates with the first plate and the second spreading roller cooperates with the second plate.

A vacuum valve of this kind, of the type mentioned at the beginning, can be gathered from CN 204 26 77 68 U.

A drawback of the use of spreading rollers instead of balls is the relatively large overall size of the closure unit with regard to its total thickness (=extension in the spreading direction). When the spreading rollers are mounted on their axle pins so as to slide, there is the risk that, due to the friction conditions that arise, the spreading rollers will slide over the plate surfaces during the spreading apart of the first and second plates, rather than rolling over them, this in turn resulting in increased wear. The use of spreading rollers mounted on rolling elements requires a much greater diameter of the spreading rollers, however, with the result that the thickness of the closure unit would be increased further.

SUMMARY

The object of the invention is to provide an advantageous vacuum valve of the type mentioned at the beginning, in which a relatively small overall height with regard to the thickness (=extent with regard to the spreading direction) is enabled. This is achieved by a vacuum valve having one or more features of the invention.

In the vacuum valve according to the invention, the axes of rotation of the first and second spreading rollers of each roller pair are offset from one another with regard to the displacement direction, i.e. spaced apart from one another with respect to the displacement direction. This allows the first and second spreading rollers of each roller pair to be at a spacing from one another, with regard to the spreading direction, which is less than the sum of the radius of the first spreading roller and the radius of the second spreading roller. The first and second plates can, as a result, be arranged at a smaller spacing from one another, with the result that the overall width of the closure unit and of the entire vacuum valve can be reduced.

Preferably, the first and second spreading rollers of each roller pair are spaced apart by a spacing from one another, with regard to the spreading direction, which is less than the sum of half the radius of the first spreading roller and half the radius of the second spreading roller.

The radii of the two spreading rollers of each roller pair are advantageously the same size, and in particular, all the spreading rollers of all the roller pairs have the same radius.

In order to ensure that the spreading rollers roll properly on the plates of the closure unit, the spreading rollers are preferably mounted so as to be rotatable about their axes of rotation by rolling bearings.

In an advantageous embodiment of the invention, the axes of rotation of the spreading rollers are formed by axle pins which are secured in such a way to the roller carrier configured in a plate-like manner that they each cross a window opening in the roller carrier. The spreading rollers of each roller pair in this case pass through a common window opening in the roller carrier, i.e. the axle pins of the spreading rollers of each roller pair cross the same window opening of the roller carrier.

BRIEF DESCRIPTION OF THE DRAWINGS

Further advantages and details of the invention are explained in the following text with reference to the accompanying drawing, in which:

FIG. 3 shows a view of the vacuum valve in FIG. 1 in the open state;

FIG. 4 shows a view corresponding to FIG. 2, with a front portion of the valve housing removed;

FIG. 5 shows a section along the line A-A in FIG. 4;

FIG. 6 shows a section corresponding to FIG. 5, but in the intermediate position of the roller carrier;

FIG. 7 shows a section corresponding to FIG. 5, but in the open position of the roller carrier (=in the open state of the vacuum valve);

Figure 1:
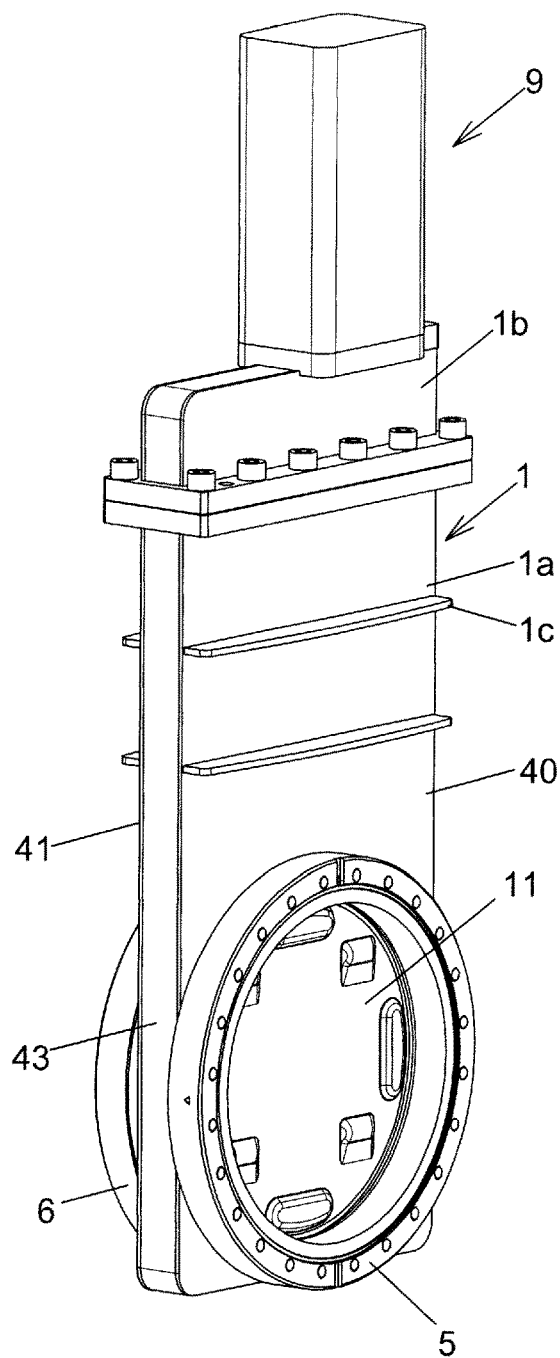
FIG. 1 shows a perspective view of an exemplary embodiment of a vacuum valve according to the invention in the closed state.
Figure 2:
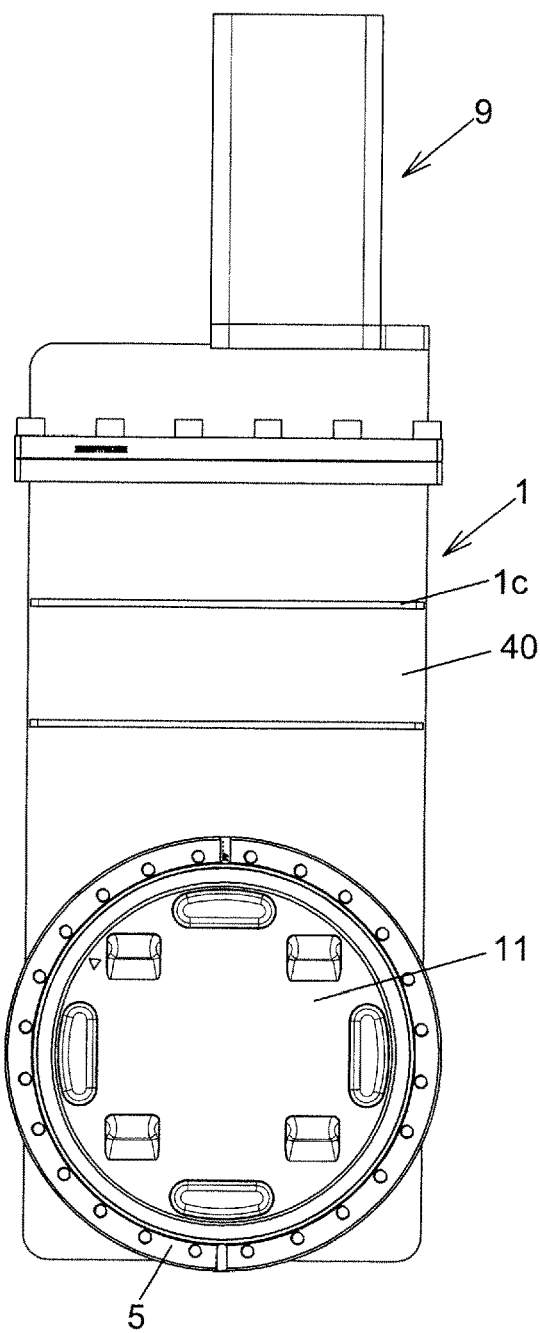
FIG. 2 shows a view of the vacuum valve in FIG. 1.
Figure 8:
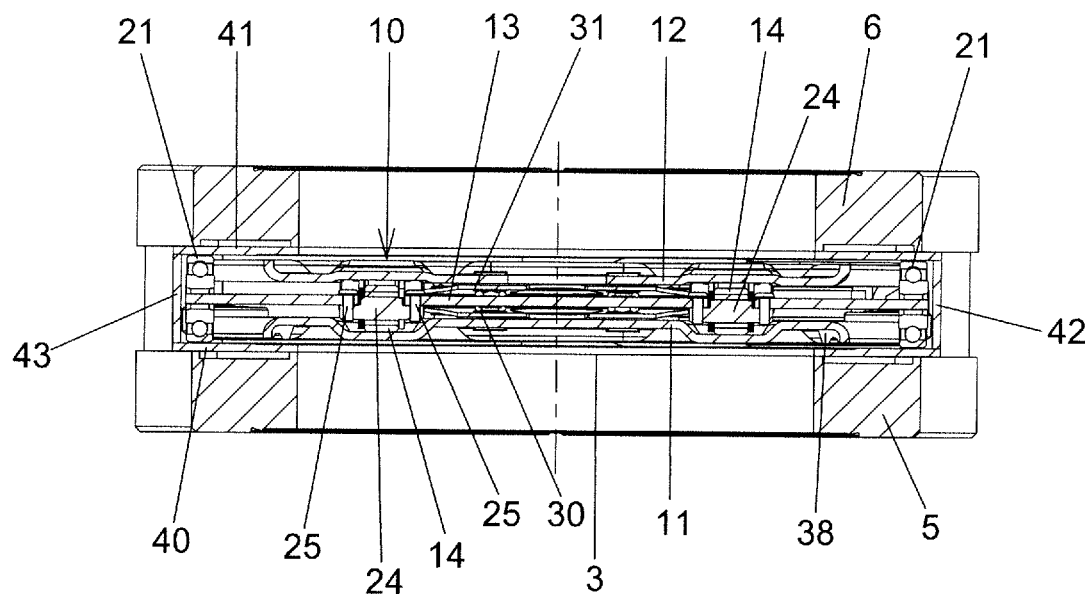
FIG. 8 shows a section corresponding to the line B-B indicated in FIG. 4, but in the intermediate position of the roller carrier.
Figure 9:
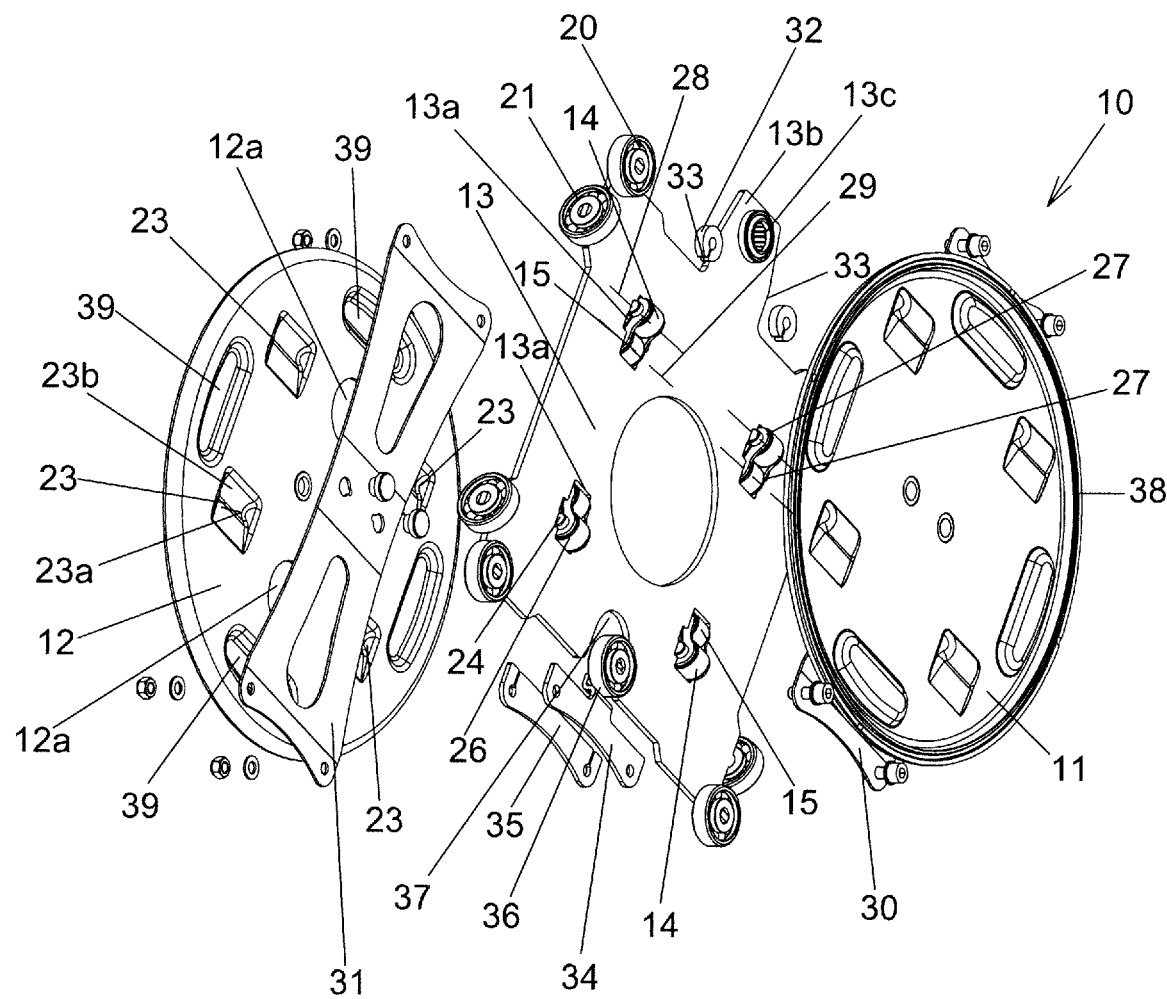
FIG. 9 shows an exploded illustration of the closure unit.

The figures are shown to different scales.

DETAILED DESCRIPTION OF THE PREFERRED EMBODIMENTS

An exemplary embodiment of a vacuum valve according to the invention is illustrated in FIGS. 1 to 13. The vacuum valve, configured in the manner of a slide valve, has a valve housing 1, wherein an interior 2 of the valve housing 1 forms a vacuum region of the vacuum valve. The valve housing has first and second valve openings 3, 4, which lead into the interior 2 of the valve housing 1. Provided in the region of the valve openings 3, 4 are flanges 5, 6 of the valve housing 1, in order to allow a vacuum-tight connection of further vacuum components, in particular vacuum chambers or pipelines, to the valve housing 1. The valve openings 3, 4 are arranged in opposing walls 40, 41 of the valve housing 1 and are preferably the same size and congruent.

The first and second valve openings 3, 4 are surrounded by first and second seat surfaces 7, 8. The seat surfaces 7, 8 face one another and are formed by portions of the wall surfaces, bounding the interior 2, of the walls 40, 41 of the valve housing 1.

Attached to the valve housing 1 is a drive unit 9 for opening and closing the vacuum valve, said drive unit 9 having a pneumatic piston cylinder unit in the exemplary embodiment. Other types of drives or a manual actuating element, arranged in the region of the drive unit 9 instead of the latter, for manually closing and opening the vacuum valve are likewise conceivable and possible.

The valve housing 1 is configured in a two-part manner in the exemplary embodiment illustrated, with a main part 1a, which has the valve openings 3, 4, and a cover part 1b, to which the drive unit 9 is attached. The two housing parts are screwed together by means of a flange connection and sealed off from one another.

In the exemplary embodiment, the opposing walls 40, 41 of the valve housing 1, which have the valve openings 3, 4, are formed from sheet metal, as are the narrow-side walls 42, 43 which connect these two walls 40, 41. In order to increase the stability, reinforcing ribs 1c are advantageously arranged on the outside of the valve housing here.

Other configurations of the valve housing 1 are likewise conceivable and possible.

Arranged in the interior 2 of the valve housing 1 is a closure unit 10. The latter has a first plate 11, a second plate 12, and a roller carrier 13, preferably configured in a plate-like manner, arranged between the first and second plates. On the roller carrier 13, spreading rollers 14, 15 arranged in pairs are mounted so as to be rotatable about axes of rotation 28, 29. Therefore, several roller pairs are provided, which are each formed by a first spreading roller 14 and a second spreading roller 15. The spreading rollers 14, 15 serve to spread apart the plates 11, 12 in a spreading direction 22, as explained in more detail below.

In order to close and open the vacuum valve, the roller carrier 13 is displaced parallel to a displacement direction 16. To this end, in the exemplary embodiment, the roller carrier 13 is connected in a known manner to the piston 9a of the drive unit via a lever mechanism. A connecting arm 17 is connected pivotably to the roller carrier 13 at one end. The connection takes place via an eye 13c in an extension 13b of the roller carrier 13. At the other end, the connecting arm 17 is connected in a pivotable manner to a pivot lever 18 which is mounted in a pivotable manner with respect to the valve housing 1. The pivot lever 18 can be pivoted by the drive unit 9, wherein, in the exemplary embodiment, a further connecting arm 19, which is mounted in a pivotable manner on the pivot lever 18 on one side and in a pivotable manner on the piston rod 9b on the other side, serves for connecting. In this way, the opening and closing of the vacuum valve can be brought about with a short piston stroke. However, it would also be conceivable and possible, for example, to use a correspondingly long-stroke piston, the piston rod of which is connected directly to the roller carrier 13.

The piston rod 9b is guided out of the vacuum region of the vacuum valve by a vacuum leadthrough. In the exemplary embodiment, a sealing ring 44 is schematically illustrated. A linear leadthrough could also be formed for example by a bellows.

The closure unit 10 is guided in a displaceable manner in the displacement direction 16 with respect to the valve housing 1, in that guide rollers 20, 21 are mounted in a rotatable manner on the roller carrier 13 in a likewise known manner. The axes of rotation of the guide rollers 20 are at right angles to the axes of rotation of the guide rollers 21. The guide rollers 20 cooperate with inner surfaces of the walls 42, 43 of the valve housing 1 and the guide rollers 21 cooperate with inner surfaces of the walls 40, 41 of the valve housing 1 and counteract any displacement of the roller carrier 13 and thus of the closure unit 10 as a whole in all directions that are at right angles to the displacement direction 16.

The displacement direction 16 and the spreading direction 22 are at right angles to one another. The axes of rotation 28, 29 of the spreading rollers 14, 15 are at right angles to the displacement direction 16 and at right angles to the spreading direction 22.

In the open state of the vacuum valve, the closure unit 10 is displaced into a position in which it clears the first and second valve openings 3, 4. A passage duct through the vacuum valve is thus cleared, said passage duct extending through the first valve opening 3, the interior 2 and the second valve opening 4. This open state of the vacuum valve is illustrated in FIGS. 3 and 7. The roller carrier 13 is in its open position in the open state of the vacuum valve.

In the closed state of the vacuum valve, cf. FIGS. 1, 2, 4 and 5, the passage through the vacuum valve is sealed off by the closure unit 10. To this end, the closure unit 10 is spread apart and the first and second plates 11, 12 are pressed against the first and second seat surfaces 7, 8. In order to seal off the first valve opening 3, the first plate 11 is provided with a seal 38 in the form of an elastic sealing ring, which may be vulcanized for example onto the plate 11. In order to vent the volume located between the first and second plates, the second plate 12 is provided with openings 12*a*. Instead of the openings 12*a*, at least one groove could for example also be provided in that region of the second plate 12 that bears against the second seat surface 8. In principle, both plates 11, 12 could also be provided with seals, in which case the openings 12*a* would be dispensed with and advantageously there would be a possibility of pumping out the interior 2.

Figure 10:
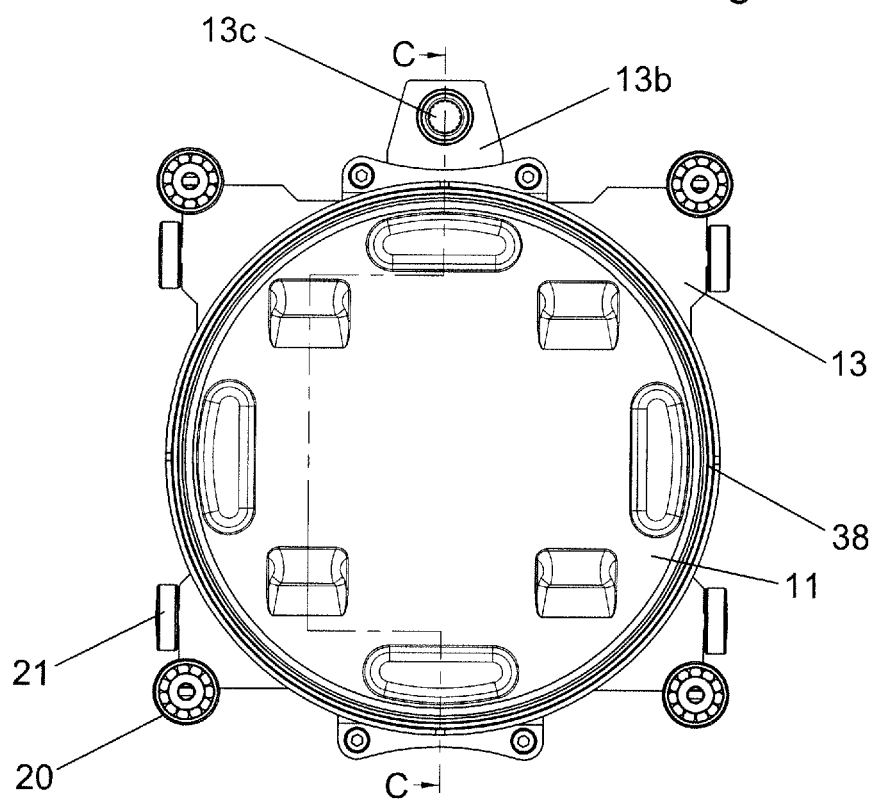
FIG. 10 shows a view of the closure unit in the state which the latter assumes in the open position and in the intermediate position of the roller carrier.
Figure 12:
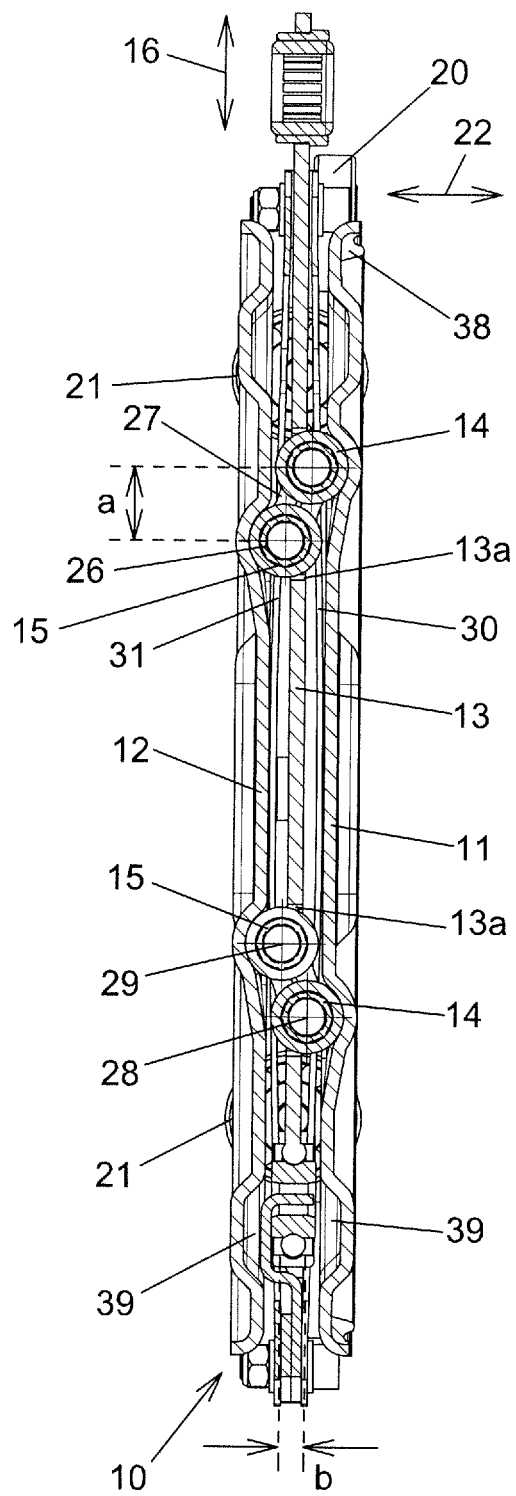
FIG. 12 shows a section along the line C-C in FIG. 10.

In the open state of the vacuum valve, i.e. in the open position of the roller carrier 13, the spreading rollers 14, 15 bear against mutually facing surfaces of the plates 11, 12 in regions in which the mutually facing surfaces of the plates 11, 12 have recesses 23. Preferably, the spreading rollers 14, 15 bear against the plates 11, 12 at the deepest points of these recesses 23. The closure unit is then in its moved-together state, which is also illustrated in FIGS. 10 and 12.

Each recess 23 has, as seen in a cross section extending parallel to the displacement direction 16 through each recessed region of each plate 11, 12, as is illustrated in FIGS. 5 to 7 and 12, 13, a rising flank 23*a* starting from its deepest point. This flank 23*a* is located on that side of the recess 23 that is remote from the drive unit 9, i.e. at the front with regard to the direction of displacement of the closure unit 10 during the closing of the vacuum valve, and forms a track for the spreading roller 14, 15 engaging in the respective recess 23.

In the exemplary embodiment, four roller pairs are provided, which are each formed by a first and a second spreading roller 14, 15 which are mounted in a rotatable manner on the roller carrier 13. Since the first and second plates 11, 12 are configured with a circular outer contour in the exemplary embodiment, the roller pairs are advantageously located at the corners of an imaginary square. More or fewer roller pairs could also be provided. Advantageously, at least three, preferably at least four, roller pairs are provided, which are not arranged on a common straight line. For example, five or six roller pairs could be provided, which are mounted in a rotatable manner distributed over the roller carrier, for example, in the case of plates 11, 12 having a circular outer contour, at least approximately around an imaginary circle which is concentric with the central axes of the plates 11, 12.

The two spreading rollers 14, 15 of each roller pair pass through respective common window openings 13*a* in the plate-like roller carrier 13. In order for the spreading rollers 14, 15 to be mounted in a rotatable manner on the roller carrier 13, axle pins 24, which pass through the respective window openings 13*a*, are fastened to the roller carrier. Fastening to the roller carrier 13 takes place in those portions of the axle pins 24 that are located on either side of the window opening 13*a*. To this end, the axle pins 24 may be welded for example to the roller carrier 13. Illustrated in FIG. 8 as a further fastening possibility are fastening screws 25 which pass through bores in the roller carrier 13 and are screwed into threaded bores in the axle pins 24. These fastening screws 25 are not illustrated in the other figures for the sake of simplicity. The fastening could also take place in some other way, for example by bolting.

The spreading rollers 14, 15 are preferably mounted in a rotatable manner on the axle pins 24 via rolling bearings 26, in particular needle bearings or ball bearings.

Provided on either side of each spreading roller 14, 15 is an abutment tab 27 through which the axle pin 24 passes. Friction of the spreading rollers 14, 15 against the narrow peripheries of the window openings 13*a* is avoided as a result. In the exemplary embodiment, a common abutment tab 27 for the two spreading rollers 14, 15 of the roller pair is provided on each side of the spreading rollers 14, 15 of each roller pair, the two axle pins 24 passing through said common abutment tab 27. It is also possible to provide separate abutment tabs, for each spreading roller 14, 15, on either side of the spreading roller 14, 15, axle pins 24 assigned to the respective spreading rollers 14, 15 passing through said abutment tabs.

The first spreading roller 14 is mounted on the roller carrier 13 so as to be rotatable about an axis of rotation 28 and the second spreading roller 15 is mounted on the roller carrier 13 so as to be rotatable about an axis of rotation 29. Since the first spreading roller 14 of each roller pair is intended to cooperate with the surface, facing it, of the first plate 11, and the second spreading roller 15 of each roller pair is intended to cooperate with the surface, facing it, of the second plate 12, the axes of rotation 28, 29 are offset, i.e. spaced apart, with regard to the spreading direction 22. In other words, the axes of rotation 28, 29 are located at different points on a coordinate axis parallel to the spreading direction 22.

In order to reduce the necessary spacing b, with regard to the spreading direction 22, of the axes of rotation 28, 29, the axes of rotation 28, 29 are also offset, i.e. spaced apart, from one another with regard to the displacement direction 16. In other words, the axes of rotation 28, 29 are located at different points on a coordinate axis parallel to the displacement direction 16.

The spacing a, with regard to the displacement direction 16, between the axes of rotation 28, 29 of the spreading rollers 14, 15 of each roller pair is advantageously at least 80% of a sum of the radius of the first spreading roller 14 and the radius of the second spreading roller 15, wherein a value of at least 90% of the sum of these radii is preferred.

Advantageously, the spacing a, with regard to the displacement direction 16, between the axes of rotation 28, 29 of the spreading rollers 14, 15 of each roller pair is less than the sum of the diameter of the first spreading roller and the diameter of the second spreading roller, wherein a value of at most 75% of the sum of these diameters is preferred.

In the exemplary embodiment, the spacing a corresponds approximately to the sum of the radii of the two spreading rollers 14, 15 (±5%), this being particularly preferred.

The spacing, with regard to the spreading direction b, between the two axes of rotation 28, 29 of the spreading rollers 14, 15 of each roller pair is less than the sum of the radius of the first spreading roller 14 and the radius of the second spreading roller 15. Preferably, the spacing b is less than half the sum of the radius of the first spreading roller 14 and the radius of the second spreading roller 15.

The radii of all the spreading rollers 14, 15 are the same in the exemplary embodiment shown, as is preferred.

For different roller pairs, the axes of rotation 28, 29 of the first and second spreading rollers 14, 15 can be offset in opposite directions parallel to the displacement direction 16, i.e., with regard to the direction of the displacement of the closure unit 10 during the closing of the vacuum valve, the first spreading roller 14 is further forward than the second spreading roller 15 in at least one of the roller pairs, and the second spreading roller 15 is further forward than the first spreading roller 14 in at least one other of the roller pairs. In the exemplary embodiment, the axes of rotation 28, 29 of those roller pairs that are located at the same point with regard to the displacement direction 16 are offset with respect to one another in the same direction parallel to the displacement direction 16.

The amount of the offset, with regard to the displacement direction 16, between the axes of rotation 28, 29 of the spreading rollers 14, 15 is advantageously the same for all the roller pairs.

In a manner corresponding to the offset of the two spreading rollers 14, 15 of each roller pair with regard to the displacement direction 16, the recesses 23, assigned to the two spreading rollers 14, 15 of this roller pair, in the first plate 11 and second plate 12 are offset in the same way. The recesses 23, assigned to each roller pair, in the two plates 11, 12 are preferably configured in a mirror-inverted manner, wherein they are displaced with respect to one another with regard to the displacement direction 16 and the size of this displacement corresponds to the spacing a, with regard to the displacement direction 16, between the two spreading rollers 14, 15 of each roller pair.

An offset of the two spreading rollers 14, 15 of one, some or all of the roller pairs in a direction at right angles to the displacement direction 16 and at right angles to the spreading direction 22 and thus a corresponding offset of the recesses 23 is in principle possible, wherein such an offset would preferably amount to less than half the lengths of the spreading rollers 14, 15.

Further recesses 39 formed in the plates 11, 12 are advantageously provided in order to increase the flexural rigidity of the plates.

The first plate 11 and second plate 12 of the closure unit 10 are pressed, with their surfaces directed toward one another, against the spreading rollers 14, 15 by a spring. This spring comprises, in the exemplary embodiment shown, a first spring arm 30 attached to the first plate 11 and a second spring arm 31 attached to the second plate 12. The spring arms 30, 31 are each configured as leaf springs and are connected to the respective plates 11, 12 in a central region and in each case to one another at their two ends. The connections are each embodied as screw connections in the exemplary embodiment. Welding or riveting is also possible, for example. Sliding disks 32 are arranged at the one ends of the spring arms 30, 31, between the latter. These sliding disks 32 cooperate with guide surfaces 33, extending parallel to the displacement direction 16, of the roller carrier 13 and effect guidance between the plates 11, 12 and the roller carrier 13 in the displacement direction 16. At the other ends, spacing lamellae 34, 35 are arranged between the spring arms 30, 31. A guide roller 36 is mounted in a rotatable manner on the spacing lamella 34. This guide roller 36 is located in a cutout 37 in the roller carrier 13 and cooperates with side faces, extending parallel to the displacement direction 16, of this cutout 37, with the result that further guidance of the first and second plates 11, 12 with respect to the roller carrier 13 parallel to the displacement direction 16 is brought about. As a result, a guiding device for the rectilinear displacement of the first and second plates 11, 12 with respect to the roller carrier 13 parallel to the displacement direction 16 is thus formed. Different modifications of such a guiding device are conceivable and possible; for example at least one roller can be used instead of the sliding disks 32 or at least one sliding element can be used instead of the guide roller 36. Omission of the sliding disks 32 or omission of the guide roller 36 is also conceivable and possible, such that guidance parallel to the displacement direction 16 takes place only at one point.

By way of the spring having the spring arms 30, 31, the first plate 11 and the second plate 12 are pulled apart in the exemplary embodiment, with the result that the plates 11, 12 are pressed against the spreading rollers 14, 15. Instead of this, in each case one spring could also be present between the respective plates 11, 12 and the roller carrier 13, with the result that the respective plates 11, 12 are pressed against the spreading rollers 14, 15 assigned thereto.

Springs for pressing the plates 11, 12 against the spreading rollers 14, 15 could also be configured in some other way, for example in the form of helical springs. More than one spring could be provided for this purpose.

In order to close the vacuum valve, proceeding from its open state, in which the roller carrier 13 assumes its open position (cf. FIG. 7), the roller carrier 13 is displaced parallel to the displacement direction 16 by the drive unit 9. As a result, the entire closure unit 10 is displaced parallel to the displacement direction 16. When the roller carrier 13 reaches its intermediate position, cf. FIG. 6, the first and second plates 11, 12 are located between the first and second valve openings 3, 4, i.e. the closure unit 10 covers the first and second valve openings 3, 4 (as seen in the direction of the axes of the valve openings 3, 4). While the roller carrier 13 is being displaced from the open position into the intermediate position, the relative position between the roller carrier 13 and the first and second plates 11, 12 does not change. The pulled-together state of the closure unit 10, illustrated in FIG. 10 and FIG. 12, is maintained.

During the further displacement of the roller carrier 13 in the displacement direction 16, further displacement of the first and second plates 11, 12 with respect to the valve housing 1 in the displacement direction 16 is blocked. In the exemplary embodiment shown in the figures, the spacing lamellae 34, 35 extend to this end with their end faces against an abutment surface of the valve housing 1. Blocking of the displacement of the first and second plates 11, 12 with respect to further displacement in the displacement direction 16 could also take place in some other way, for example in that the first plate 11 and/or second plate 12 butts directly against a (respective) stop surface(s) of the valve housing or of a part connected thereto.

Thus, during this further displacement of the roller carrier 13 in the displacement direction 16, the roller carrier and thus the spreading rollers 14, 15 mounted in a rotatable manner thereon are displaced with respect to the first and second plates 11, 12. In this case, the spreading rollers 14, 15 roll along the rising flanks 23a of the recesses 23, wherein the plates 11, 12 are spread apart and thus moved against the seat surfaces 7, 8.

When the roller carrier 13 has reached its closed position, the elastic seal 38 of the first plate 11 is pressed against the first seat surface 7 and the first valve opening 3 is sealed off thereby. The second plate is pressed against the second seat surface 8.

Figure 11:
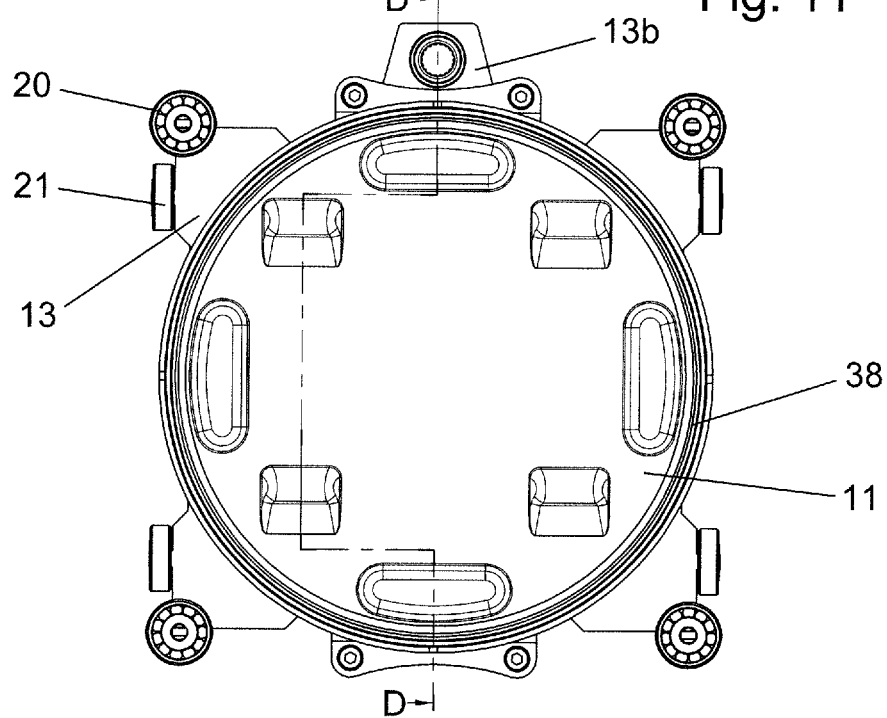
FIG. 11 shows a view of the closure unit in the state which the latter assumes in the closed position of the roller carrier (=in the closed state of the vacuum valve)
Figure 13:
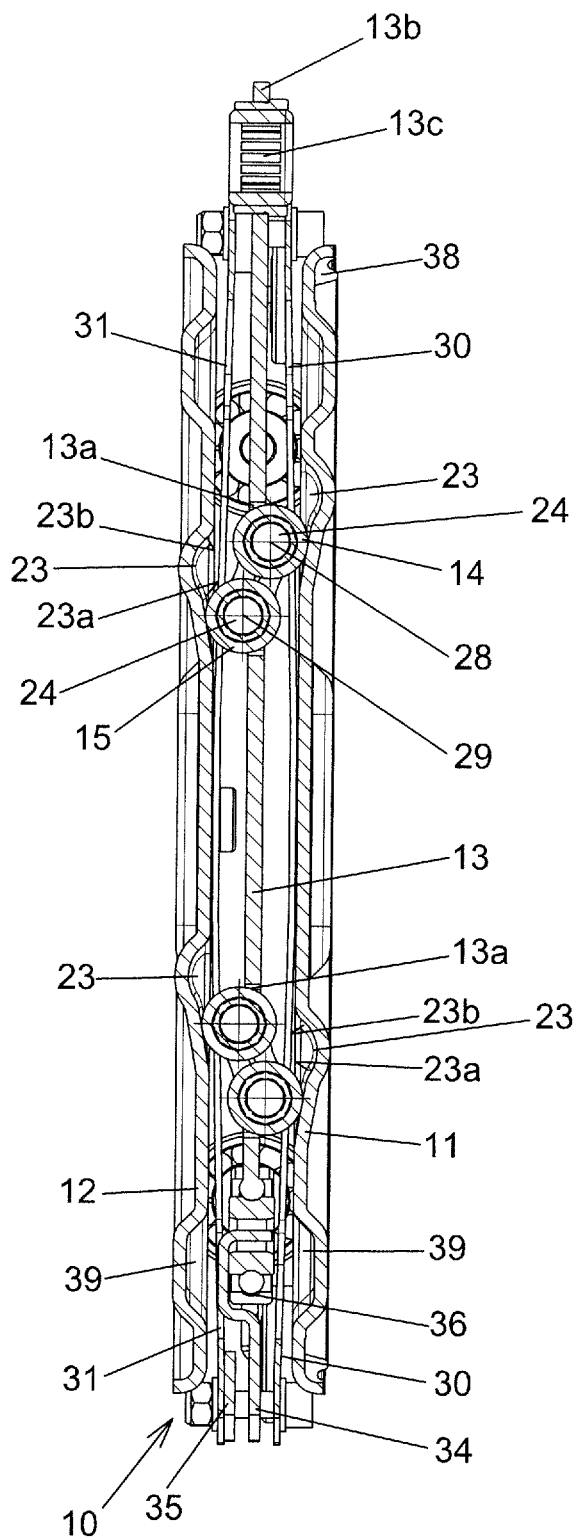
FIG. 13 shows a section along the line D-D in FIG. 11.

The spread-apart state, which the closure unit 10 assumes in the closed state of the vacuum valve, is illustrated in FIGS. 11 and 13.

In order to open the vacuum valve, the roller carrier 13 is displaced, proceeding from its closed position, in the direction of its open position, parallel to the displacement direction 16. While the roller carrier 13 is moving from its closed position into its intermediate position, the spreading rollers 14, 15 are pushed by the force of the spring in the direction of the deepest points of the recesses 23, wherein the roller carrier 13 is displaced with respect to the plates 11, 12 with regard to the displacement direction 16 and the plates 11, 12 move together. In the intermediate position of the roller carrier 13, the moved-together state of the closure unit 10 is reached again. Subsequently, during the further displacement of the roller carrier 13, the plates 11, 12 are carried along in the direction of its open position. Further displacement of the roller carrier 13 with respect to the first and second plates 11, 12 does not occur, specifically, in the exemplary embodiment, on account of the steep rise of the flank 23b of the respective recesses 23, which is located on the opposite side of the recess 23 from the flank 23a.

Instead of this steep rise of the flanks 23b or in addition thereto, a corresponding stop could also be provided between the roller carrier 13 and the first and/or second plate 11, 12 or a part connected thereto (in particular the spring arms 30, 31).

Different further modifications of the exemplary embodiment shown are conceivable and possible without departing from the scope of the invention, for example with regard to the guiding device between the roller carrier 13 and the first and second plates 11, 12, by way of which the first and second plates 11, 12 are guided parallel to the displacement direction 16 with respect to the roller carrier 13.

KEY TO THE REFERENCE NUMERALS

| | |
|---|---|
| 1 | Valve housing |
| 1a | Main part |
| 1b | Cover part |
| 1c | Reinforcing rib |
| 2 | Interior |
| 3 | First valve opening |
| 4 | Second valve opening |
| 5 | Flange |
| 6 | Flange |
| 7 | First seat surface |
| 8 | Second seat surface |
| 9 | Drive unit |
| 9a | Piston |
| 9b | Piston rod |
| 10 | Closure unit |
| 11 | First plate |
| 12 | Second plate |
| 12a | Opening |
| 13 | Roller carrier |
| 13a | Window opening |
| 13b | Extension |
| 13c | Eye |
| 14 | First spreading roller |
| 15 | Second spreading roller |
| 16 | Displacement direction |
| 17 | Connecting arm |
| 18 | Pivot lever |
| 19 | Connecting arm |
| 20 | Guide roller |
| 21 | Guide roller |
| 22 | Spreading direction |
| 23 | Recess |
| 23a | Flank |
| 23b | Flank |
| 24 | Axle pin |
| 25 | Fastening screw |
| 26 | Rolling bearing |
| 27 | Abutment tab |
| 28 | Axis of rotation |
| 29 | Axis of rotation |
| 30 | First spring arm |
| 31 | Second spring arm |
| 32 | Sliding disk |
| 33 | Guide surface |
| 34 | Spacing lamella |
| 35 | Spacing lamella |
| 36 | Guide roller |
| 37 | Cutout |
| 38 | Seal |
| 39 | Recess |
| 40 | Wall |
| 41 | Wall |
| 42 | Wall |
| 43 | Wall |
| 44 | Seal |

The invention claimed is:

1. A vacuum valve comprising:
a valve housing with an interior and first and second valve openings which are surrounded by first and second seat surfaces, and
a closure unit arranged in the interior of the valve housing, said closure unit having a first plate, a second plate, a roller carrier arranged between the first plate and the second plate, a plurality of roller pairs which are each formed by a first spreading roller and a second spreading roller which are mounted on the roller carrier so as to be rotatable about respective axes of rotation, and at least one spring by which the first and second plates are pulled against the spreading rollers, which bear against mutually facing surfaces of the first and second plates,
the roller carrier is displaceable, parallel to a displacement direction, from an open position, in which the vacuum valve is open and the first and second valve openings are cleared, via an intermediate position, in which the first and second plates are located between the first and second valve openings but are spaced apart from the first and second seat surfaces, into a closed position, in which the vacuum valve is closed, and during the displacement of the roller carrier from the open position into the intermediate position, the first and second plates are carried along by the roller carrier, and during the displacement of the roller carrier from the intermediate position into the closed position, any further displacement of the first and second plates in the displacement direction is blocked,
in the open position and intermediate position of the roller carrier, the first spreading roller of each said roller pair bears against the surface of the first plate in a region of a respective recess in the surface of the first plate, and the second spreading roller of each said roller pair bears against the surface of the second plate in a region of a respective recess in the surface of the second plate, and during the displacement of the roller carrier from the intermediate position into the closed position, the first and second spreading rollers are displaced along rising flanks of the recesses and in the process spread apart the first and second plates parallel to a spreading direction, and
the axes of rotation of the first and second spreading rollers of each said roller pair are offset from one another with regard to the displacement direction and are at a spacing (b), with regard to the spreading direction, which is less than a sum of a radius of the first spreading roller and a radius of the second spreading roller.

2. The vacuum valve as claimed in claim 1, wherein the radius of the first spreading roller is equal to the radius of the second spreading roller of each said roller pair.

3. The vacuum valve as claimed in claim 1, wherein the spreading rollers are mounted so as to be rotatable about axes of rotation thereof by rolling bearings.

4. The vacuum valve as claimed in claim 1, wherein the roller carrier is configured in a plate-like manner.

5. The vacuum valve as claimed in claim 4, wherein the spreading rollers of each said roller pair are arranged in respective common window openings in the roller carrier.

6. The vacuum valve as claimed in claim 5, wherein the axis of rotation of each said spreading roller is formed by an axle pin that bridges the window opening and is secured to the roller carrier.

7. The vacuum valve as claimed in claim 6, wherein each said axle pin passes through abutment tabs arranged on both sides of each said spreading roller.

8. The vacuum valve as claimed in claim 7, further comprising, for both said spreading rollers of each said roller pair, a common abutment tab is provided on each of two opposite sides of the spreading rollers, said abutment tab being passed through by the axle pins of both said spreading rollers.

9. The vacuum valve as claimed in claim 1, further comprising a guide device for guiding the first and second plates in a displaceable manner in the displacement direction with respect to the roller carrier.

10. The vacuum valve as claimed in claim 1, wherein the axes of rotation of the first and second spreading rollers of each said roller pair are at a spacing (b), with regard to the spreading direction, which is less than half the sum of the radius of the first spreading roller and the radius of the second spreading roller.

* * * * *